Sept. 10, 1929. F. C. BRANDENBURG 1,727,364
SHOVEL HANDLE
Filed Jan. 23, 1924
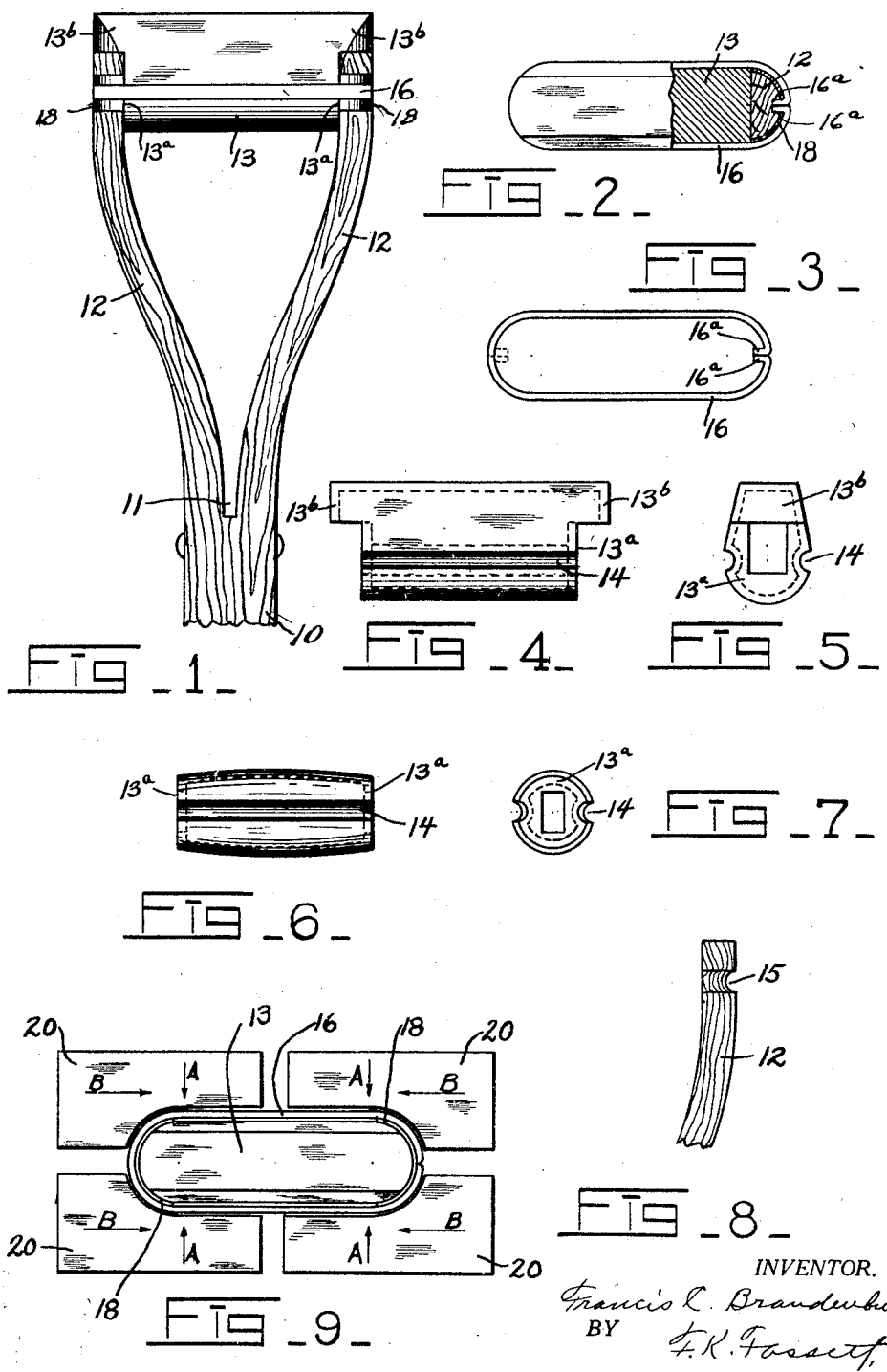

Patented Sept. 10, 1929.

1,727,364

UNITED STATES PATENT OFFICE.

FRANCIS C. BRANDENBURG, OF PIQUA, OHIO, ASSIGNOR TO THE WOOD SHOVEL AND TOOL COMPANY, OF PIQUA, OHIO, A CORPORATION OF OHIO.

SHOVEL HANDLE.

Application filed January 23, 1924. Serial No. 687,921.

This invention relates to improvements in shovel handles of the type in which the end of a round shaft is split and the resulting semi-round members bent to form a fork, a grip then being secured between the tines of this fork.

Handles of this kind are extensively used and they are rapidly displacing the well known D handles, for at least two reasons: A D handle requires approximately three times the amount of lumber that is required to make the type of handle here shown, which, in view of the constantly increasing scarcity of lumber suitable for shovel handles, with the consequent increase in cost of such lumber, makes adoption of the split handle almost necessary. And the split handle is lighter than the D handle.

But notwithstanding the almost compelling reasons favoring the use of split handles, their adoption has been retarded by the fact that heretofore there has been no entirely satisfactory way to secure the grip to the tines of the fork. Many ways have been devised for accomplishing this and numerous inventions along this line have been patented, but none has been entirely satisfactory, strength, durability, weight, cost, etc., being considered. In my application filed May 11, 1923, serially numbered 638,278, I disclosed a manner of securing the grip to the tines of the fork, and the present invention is an improvement, or perhaps it would be better to say a modification of the construction shown in said former application. As I stated in said application, the principal object of my invention is to produce a handle of the type mentioned, which possesses all of the desirable qualities of the type, but none of the defects and undesirable qualities which handles of the kind heretofore have had. Another object is to accomplish this major purpose and yet keep the cost of the handle as low as, if not lower than, the best of such handles heretofore produced. Another object of my present invention is to provide for producing handles at even a lower cost than that of the handle described in said application. Another object is to adapt my invention to a particular species of shovel, one in which a secure attachment of the grip to the tines of the fork is particularly important.

I shall describe my invention in connection with the accompanying drawing, in which Fig. 1 illustrates a handle for a molder's shovel, in which the grip is so formed that the molder can invert his shovel and use the handle for tamping sand into a flask;

Fig. 2 is an end view of the handle shown in Fig. 1, a portion being cut away to show certain of the structural features;

Fig. 3 is a view of the band for securing the grip to the tines of the fork;

Figs. 4 and 5 are two views of the grip shown in Fig. 1;

Figs. 6 and 7 are two views of another form of grip, which may be used instead of the grip shown in Fig. 1;

Fig. 8 is a fragmental view of one of the tines of the fork; and

Fig. 9 is a view showing the die for shrinking the band into the groove.

Referring now to Fig. 1 the handle is found to comprise a wooden shaft 10 which is split by a saw cut, as at 11, and the two half round members thus formed are given a double bend, forming a fork with tines 12 whose extremities have flat faces in apposed parallel relationship. The grip 13 has a flat surface 13$^a$ at each end which abuts the inner faces of the tines. The form of the grip is better shown in Figs. 4 and 5, and it is seen to have a groove 14 running along each side from one flat face 13$^a$ to the other. In cross section one half of the grip is circular, that is from one groove to the other. The other half is in the form of a truncated wedge. The upper portion of this wedge shaped part extends beyond the faces 13$^a$, so as to overlie the ends of the tines, these extensions being indicated by the numeral 13$^b$. The ends of the tines are provided with grooves 15, which, when the grip is in place between them, as in Fig. 1, register with the grooves 14 in the grip. The grip is secured to the tines by means of a metallic band 16 which lies in the grooves 14 and 15, and being under tension it holds the tines firmly against the ends 13ª of the grip. As a protection to the wood and to prevent its splintering under the pressure of the band, I surround the tines with sheet metal strips 18. These strips are formed with depressions which lie in the grooves in the tines, while the band lies in the depressions in the strips. See Fig. 2.

In my former application I showed a grip slightly barrel-shape, this being the preferred form for shovels for general use. The grip shown in Figs. 1, 4 and 5 of the present application is for use on a shovel whose handle is to be used for tamping, as a molder's shovel, for example. In my former application the band 16 was endless, the ends of the metallic strip forming the band being welded together to form the endless band. That kind of band is equally applicable to the structure shown in the present application. But instead of an endless band I here show the band, illustrated in Fig. 3, consisting of a strip of metal bent into the required shape with its juxtaposed ends bent inward, as at 16ª. When the band is put in place around the grip and tines these ends 16ª are tucked through an aperture in the strip 18 into a corresponding aperture in the tine, both of these apertures, of course, being in the groove. See Fig. 2. In the beginning the band is too large and it is compressed to a size which makes it bind the parts firmly together by means of a bulldozing die, as I shall now explain.

In Fig. 9 I show the grip 13 set in the bulldozing die comprising four segmental members 20. The metal strips 18 are in place on the tines and the band 16 is in position to be compressed into the grooves, the ends 16ª being in the apertures prepared to receive them. The first part of the compressing operation consists in moving the die members 20 in the direction of the arrows marked A A A A. Thus the band is pressed into the grooves in the grip. So far the band has been contracted but little, if any. Holding the die members together, they are next pressed toward each other in the direction indicated by the arrows B B B B. As the longitudinal portions of the band are closely confined by the walls of the grooves and the die members, this second movement of the die members upsets or contracts the metal of the band, causing the band to closely hug the bottom of the grooves. The die members are pressed together with sufficient force to compress the wood of the tines slightly, and even the grip itself if it is composed of a compressible material. As the wood is more resilient than the metal band it tends to expand when the die pressure is removed, which tendency is resisted by the band, and thus the band is actually put in tension, and it holds the tines tightly to the ends of the grip. I have shown no means for supporting or moving the die segments, because tools of this kind are well known and understood by those skilled in the die making art. Given the main characteristics of a novel die, and the movements its parts are required to make, and a skilled tool designer will have no difficulty in devising the required operating connections.

Not only does the band clamp the tines to the ends of the grip, but lying in grooves, which it fits snugly, the several sectors of the band crossing the junctures of the tines and grip act as splines and prevent the slightest movement of the parts with reference to each other. Thus is overcome the principal difficulty which has heretofore been met in shovel handles of this type.

Uniting the ends of the band in the manner here shown is quite as effective as welding the ends, and being less expensive it has commercial advantage. Another advantage lies in the fact that in spite of all the care which is practicable in manufacturing on a large scale, some of the endless bands will be found imperfectly welded, and some of these will break after the shovels get into service. My present method of uniting the ends of the strip eliminates this element of uncertainty. For several reasons I use strips of metal half round in cross section. The metal is very soft and pliable in the beginning, but making the short bend which is necessary in forming the anchors 16ª hardens the metal and makes it rigid. The aperture in the strip 18 through which the anchors are tucked is round and of such size that the two half round anchors practically fill it. The whole band is hardened and stiffened by upsetting it with the dies. Therefore, it is impossible for the anchors to get out of the aperture in which they lie. I have shown a band which has but one anchorage of the kind described, but it is evident that a similar anchorage may be made in each tine. See Fig. 3. In other words, the band may be made of two pieces of metal, one lying on each side of the grip, and the ends of these pieces united at the two tines just as they are joined at one tine in the drawing. Clearly one is the equivalent of the other and it is unnecessary to illustrate this two piece construction. While I have shown anchors of such length that they pass clear through the underlying metal strip and into a hole in the tine, this is not essential. For, obviously, the metal strip is the real connecting element. After the parts are assembled and the band shrunk, the whole is smoothed up on a sand belt and in its finished state my handle is very attractive, and its practicability is evident at a glance.

All that I have heretofore said applies as well to the barrel shaped grip shown in my former application as to the grips shown in my present application. But for a molder's shovel the grip shown in Fig. 1 has two advantages. While the band holds the grip so securely that a handle with the barrel shaped grip may be used for tamping without injury to the handle, the overlying extensions 13$^b$ reinforce the handle by bringing the impact directly on the ends of the tines. Another advantage of the extensions 13$^b$ is that the tamping surface of the grip is as long as the handle is wide and enables the molder to tamp sand which is against the side of his flask.

Grips for shovels of the type described are usually made of wood, in which case they are solid. Solid grips may be made of other materials, however, as is obvious. Figs. 4, 5, 6 and 7 illustrate hollow grips. These may be made of aluminum, malleable iron or other suitable material. I believe grips, either solid or hollow, having the lengthwise grooves adapting them to be used on my improved handles, are novel as articles of manufacture. I therefore make broad claims thereon. Instead of splitting the wooden shaft to form a fork some shovel makers have made metal forks and attached them to the wooden shaft. My method of attaching the grip to the tines of the fork may be employed with these metal forks as well as with the wooden tines. In such cases the underlying strips 18 may be omitted and holes provided in the metal tines to receive the anchors 16$^a$ of the bands.

While I have illustrated and described the preferred embodiment of my invention, with certain modifications thereof, it is not to be supposed that I limit my invention to these. Other modifications may be made while keeping within the spirit of my invention and the scope of my claims.

What I claim as my invention is as follows:

1. A shovel handle comprising a two tined fork, a grip between the tines of the fork, with one end abutting each tine, and a band which passes around the tines and grip and binds the tines to the grip, said band comprising a strip of metal whose ends are bent inward and tucked into an aperture in one of the members which the band encompasses.

2. A shovel handle comprising a two tined fork, a grip between the tines of the fork with one end abutting each tine, a band which encompasses the tines and grip, comprising a strip of metal whose ends are bent inward and tucked into an aperture in one of the tines, the band being under tension whereby it binds the tines tightly to the ends of the grip.

3. A shovel handle comprising a two tined fork, a grip between the tines of the fork with one end abutting each tine, a band which encompasses the tines and grip and binds them together, a strip of metal underlying the band at one point, the band comprising a strip of metal whose ends are bent inward and tucked through an aperture in said strip.

4. A shovel handle comprising a two-tined fork, a grip between the tines of the fork, with one end abutting each tine and a band encompassing the tines and grip, binding the tines tightly to the grip, said band lying in grooves prepared therefor, the band comprising a metallic strip whose ends are bent inward and tucked into an aperture in one of the tines.

5. A shovel handle comprising a two tined fork, a grip between the tines of the fork with one end abutting each tine, and a band encompassing the tines and grip, binding them tightly together, said band consisting of a half round strip of metal lying in grooves prepared therefor, with the flat side of the band outward, the ends of the band being bent inward and tucked into a round aperture in one of the tines.

6. A shovel handle comprising a two tined fork, a grip between the tines of the fork with one end abutting each tine, and a band encompassing the tines and grip, binding them tightly together, said band lying in grooves in the tines and along the sides of the grip, various sectors of the band thereby forming splines which prevent movement of the grip relative to the tines, a strip of metal being interposed between the band and one of the tines, the band consisting of a strip of metal having its ends bent inward and tucked through an aperture in said strip.

7. A shovel handle comprising a two tined fork, a grip between the tines of the fork with one end abutting each tine, metallic strips on said tines, a strip of metal bent to encompass the tines and grip, its ends being bent inward and tucked through an aperture in one of said caps, said band being so tight that it binds the tines to the ends of the grip.

8. A shovel handle comprising a two tined fork, a grip between the tines of the fork with one end abutting each tine, said grip having longitudinal grooves on two opposite sides which register with grooves running around the exposed portions of the tines, metallic strips covering the grooved portions of the tines, and a strip of metal bent to encompass the tines and grip, lying in said grooves, the ends of the strip being bent inwardly and tucked through an aperture in one of said caps.

9. A shovel handle comprising a two tined fork, a grip having at each end a surface which abuts the inner face of one of the tines of the fork and an extension which overlies the end of the tine, and a tight band which encompasses said tines and the grip and binds them together.

10. A shovel handle comprising a two tined fork, a grip having at each end a surface which abuts the inner face of one of the tines of the fork and an extension which overlies the end of the tine, and a band comprising a strip of metal which encompasses the tines and grip, lying in a groove prepared therefor, the ends of the strip being bent inward and tucked into an aperture in one of the members it encompasses.

11. As an article of manufacture, a grip for a shovel handle, consisting of a hollow body of a form suitable to grasp with the hand, said body having two grooves running the length of the grip, one on each of opposite sides of the grip.

12. As an article of manufacture, a grip for a shovel handle, consisting of a body of proportions suitable to be held in the hand, and having a groove running the length of the grip on two opposite sides, in cross section said grip being substantially circular on one side, that is from one groove around to the other, and having the form of a truncated wedge on the opposite side.

13. As an article of manufacture, a grip for a shovel handle, consisting of a body of proportions suitable to be held in the hand, and having a groove running the length of the grip on two opposite sides, each end of the body comprising a flat surface adapted to abut a similar surface on the member to which the grip is attached, in cross section said grip being substantially circular on one side, that is from one groove around to the other, and having the form of a truncated wedge on the opposite side, a portion of said wedge shaped part extending beyond each of said flat surfaces, so that it will overlie the handle member to which the grip is attached.

FRANCIS C. BRANDENBURG.